Figure 1:
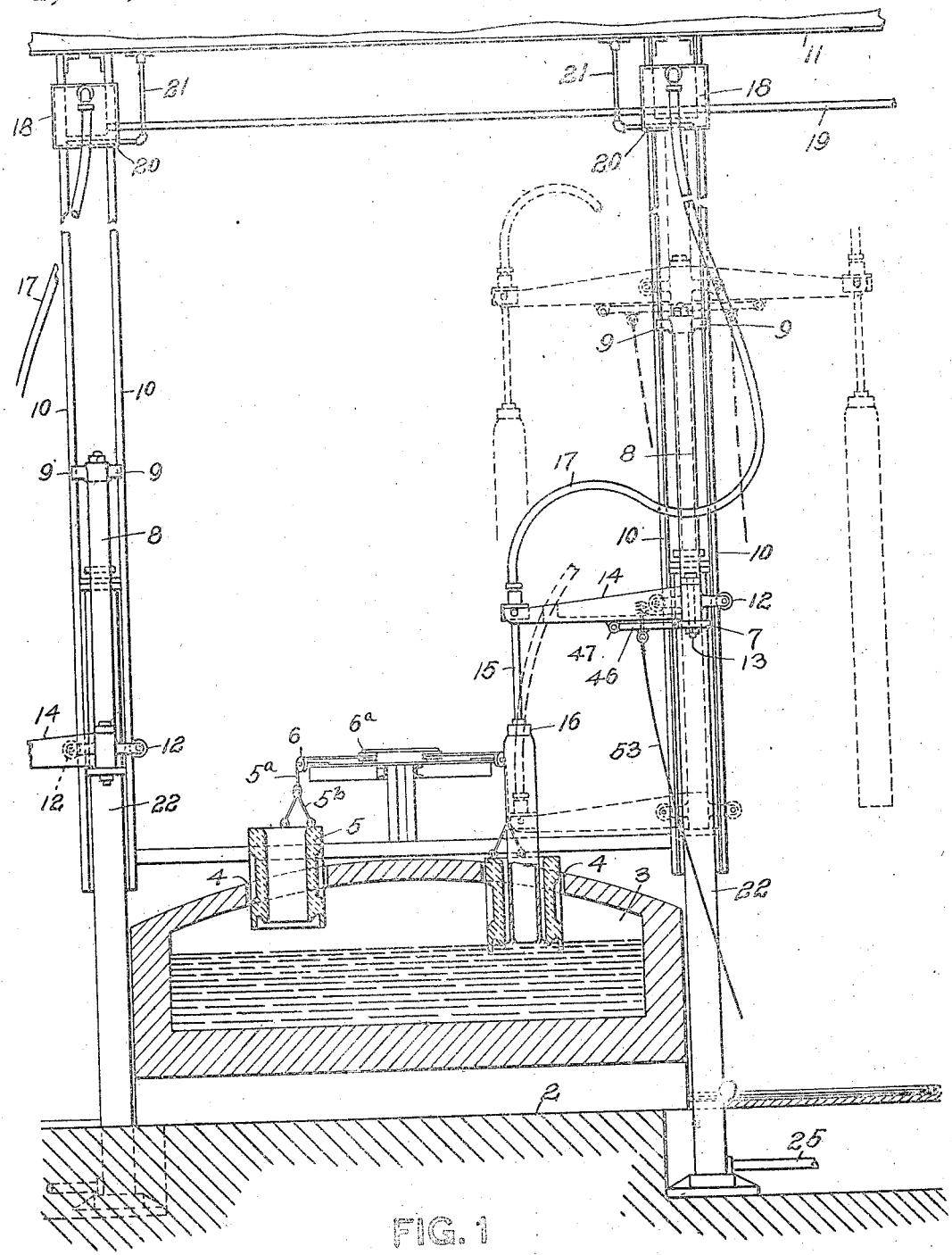

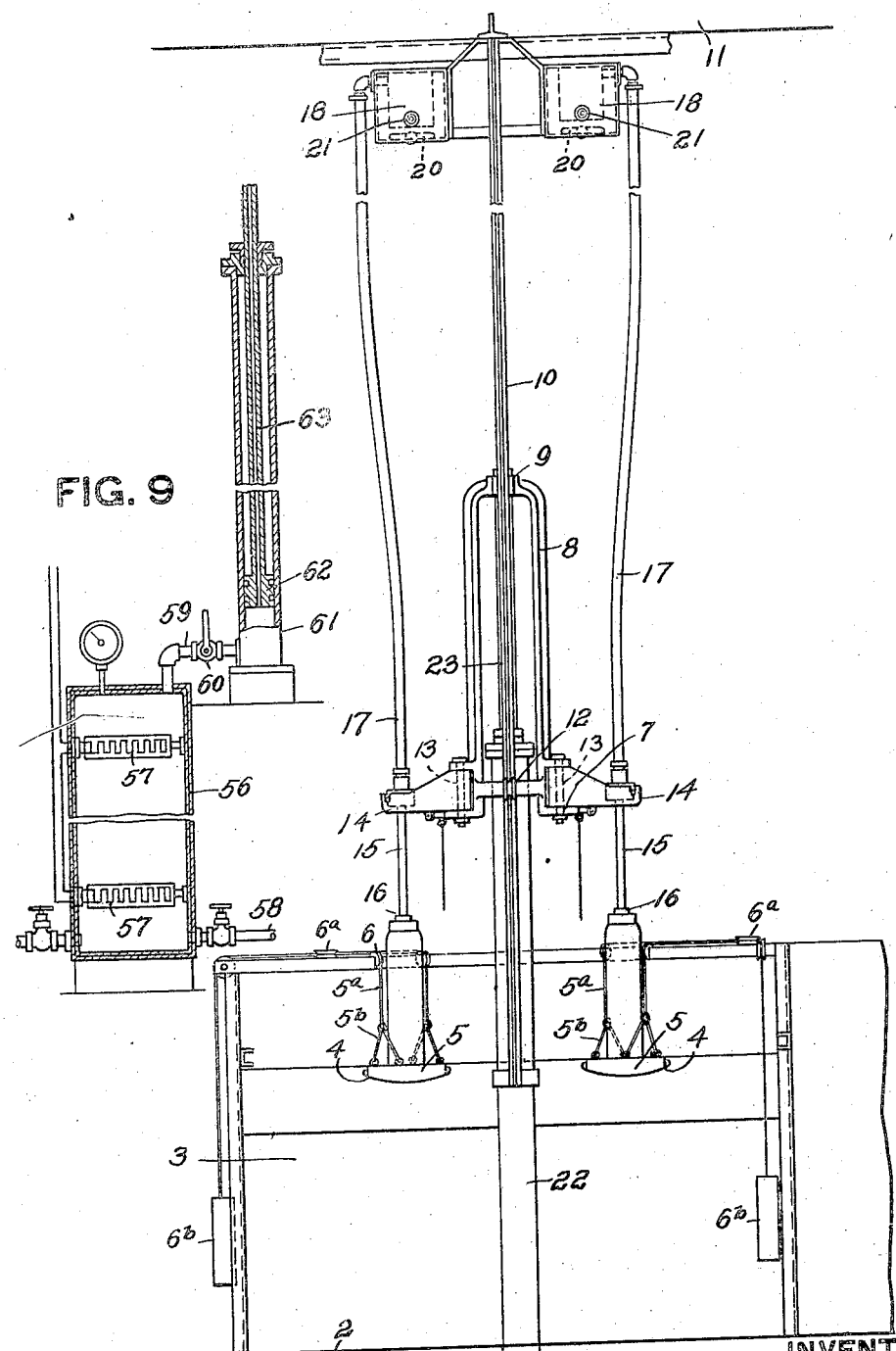

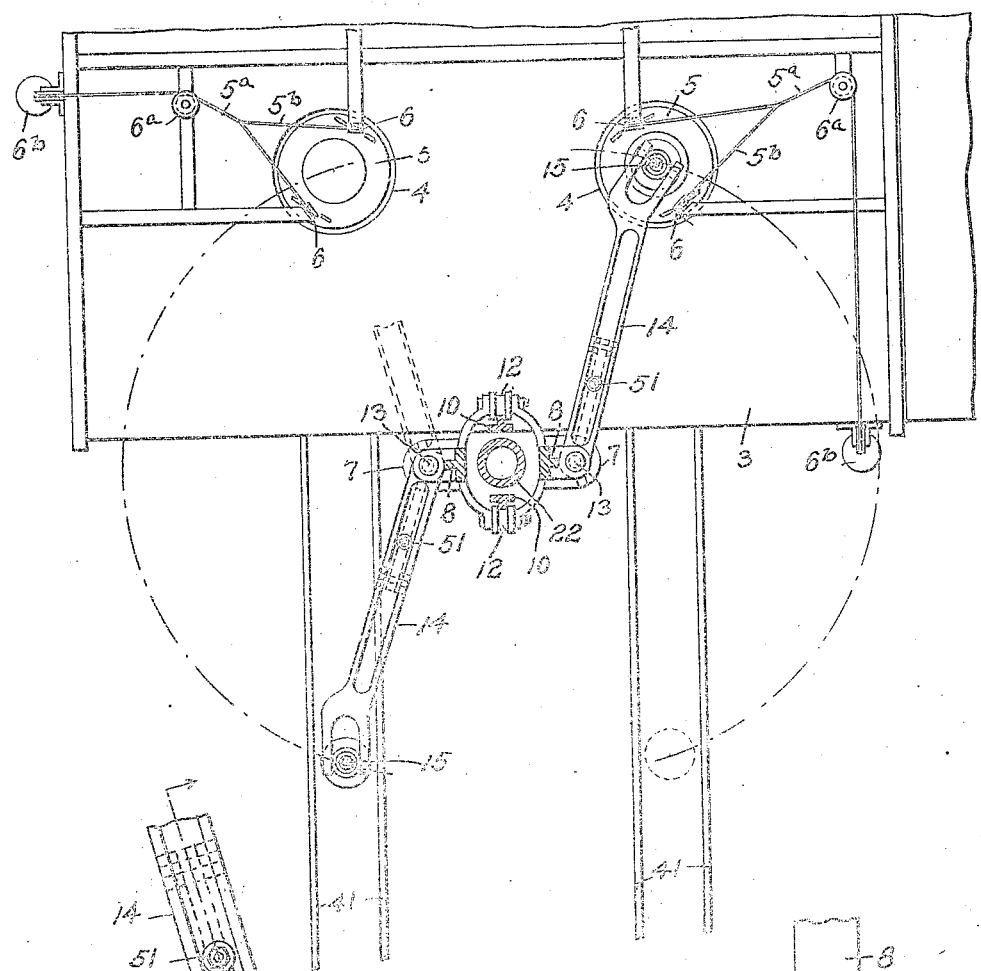

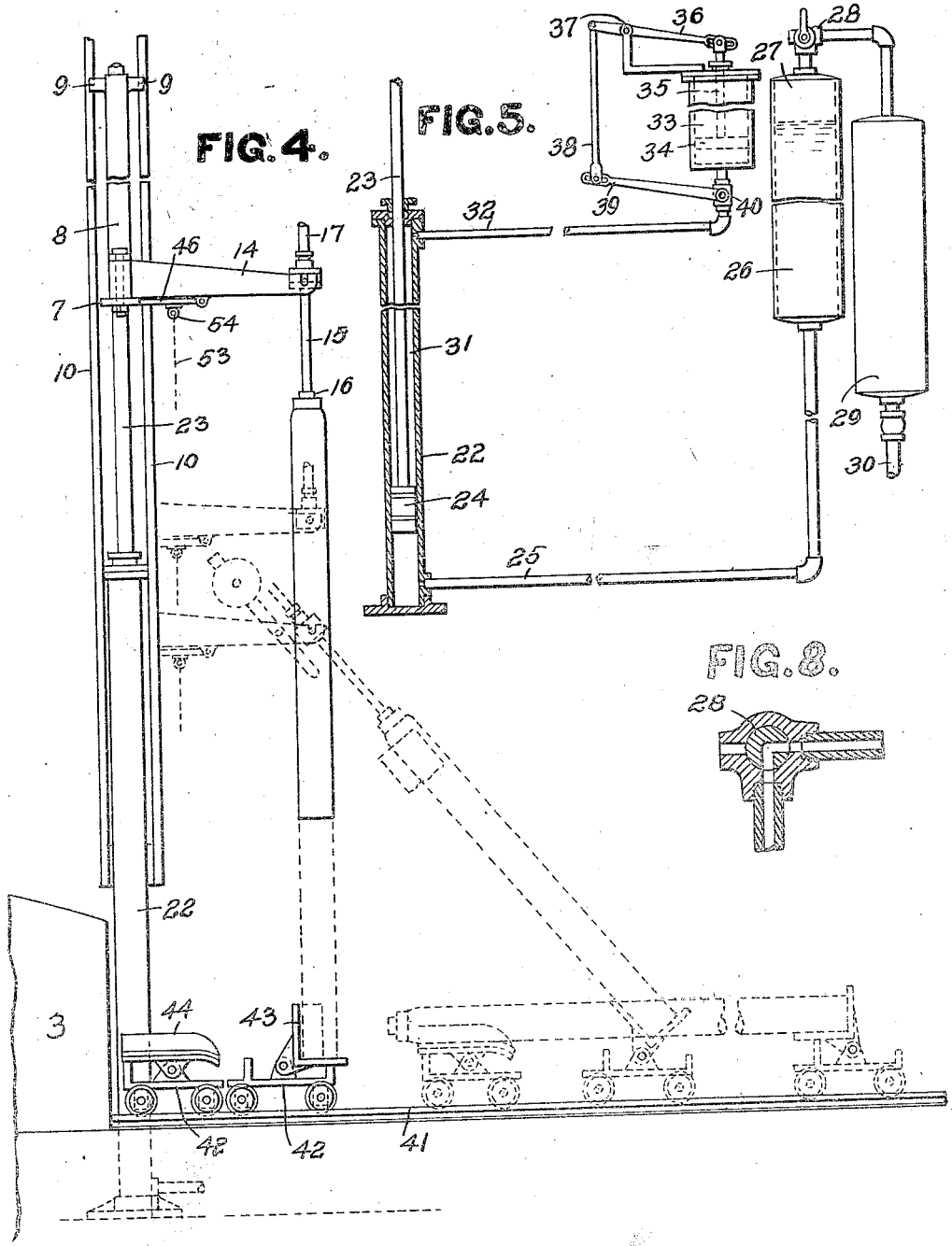

UNITED STATES PATENT OFFICE.

GEORGE C. DEBAY, OF SPRINGDALE, PENNSYLVANIA, ASSIGNOR, BY MESNE ASSIGNMENTS, TO UNIVERSAL GLASS COMPANY, OF NEW KENSINGTON, PENNSYLVANIA, A CORPORATION OF DELAWARE.

APPARATUS FOR MAKING GLASS CYLINDERS.

1,314,638.

Specification of Letters Patent.

Patented Sept. 2, 1919.

Application filed July 25, 1916. Serial No. 111,139.

*To all whom it may concern:*

Be it known that I, GEORGE C. DEBAY, a citizen of the United States, and resident of Springdale, in the county of Allegheny and State of Pennsylvania, have invented a new and useful Improvement in Apparatus for Making Glass Cylinders; and I do hereby declare the following to be a full, clear, and exact description thereof.
My invention relates to apparatus for making glass cylinders for the formation of window glass or for other purposes.

The main object of my invention is to provide a simple and efficient form of apparatus by the use of which greater uniformity of product may be obtained both as to diameter and thickness of glass.

To these ends my invention comprises the novel features hereinafter set forth and claimed.

In the accompanying drawings, Figure 1 is a side elevation of my improved blowing apparatus, the tank being shown in section; Fig. 2 is a view at right angles to Fig. 1;
Fig. 3 is a cross sectional view taken at a point above the swinging arms; Fig. 4 is a view of the take-down apparatus; Fig. 5 is an enlarged view of the hydraulically operated mechanism for lifting the cylinder in the drawing operation; Figs. 6 and 7 show details of the locking device for the swinging arm; Fig. 8 is a detail of a three-way valve for controlling the compressed air to the hydraulic cylinder for forcing up the piston of the lifting cylinder; and Fig. 9 is a modified form of my invention.

Referring to the drawings, the numeral 2 designates the suitable floor or foundation, and 3 the tank containing the molten glass.
This tank is provided with the drawing openings 4 through which the cylinder is drawn, and in connection with said openings I employ the rings 5 through which the cylinders are drawn, said rings being adapted to be raised and lowered through the openings 4. For this purpose I provide the cables 5$^b$ at opposite sides of the ring. The cable 5$^a$ passes over the guide pulleys 6, thence surrounding the horizontal pulleys 6$^a$, each cable having a weight 6$^b$ attached thereto to counterbalance the weight of the rings. It is apparent that by moving the weight, the rings are raised and lowered as desired.

In my improved apparatus I prefer to draw two cylinders at a time, and provision is made for this by the employment of the cross head 7, which has the yoke 8 connected thereto, said yoke having the guide lugs 9 at the upper end thereof which engage the guide bars 10 supported from the upper frame work 11. The cross head 7 has the rollers 12 which engage the guides 10.

Pivotally mounted by the pins 13 on the cross head 7 are the swinging arms 14, the outer ends of the arms 14 support the blow pipe 15 which carries a suitable bait 16. Air is supplied to the pipe 15 by the flexible pipe 17 which is mounted up to the air tank 18. This tank 18 is supported by the frame 11 and air is supplied to said tank from the line 19 leading from a suitable air supply.

Accordingly I provide a suitable gas burner 20 which is connected up with the gas supply pipe 21. In order to provide for the raising of the cross head in the drawing of the cylinders, I provide the cylinder 22, whose piston 23 is connected to the yoke 8 of the cross head 7. Connected to the piston rod is the pison or plunger 24. A pipe 25 is connected to the lower end of said cylinder, said pipe being connected up to the water tank 26. This water tank 26 has an air chamber 27 at the upper end thereof and air is admitted to said tank through the three-way air valve 28, said air being supplied from the air reservoir 29 connected up to the pipe 30 with a suitable compressor. The space 31 above the piston 24 of the cylinder 22 is filled with water and a pipe 32 leads from the upper end of said cylinder to a controller 33. This controller comprises a cylinder having a piston 34 which is connected up by a piston rod 35 to the lever 36 fulcrumed at 37. The outer end of the lever 36 is connected up by the rod 38 with the arm 39, said arm 39 being connected to the stem of the valve 40 in the pipe 32 leading to the controller. The par-pose of all this will fully appear in the description of operation of my improved apparatus.

At one side of the tank is the track 41 upon which travel the trucks 42. These trucks 42 have the pivotally mounted cradles 43 to receive the end of the cylinder as it is lowered in vertical position, and as said truck is moved outwardly to lower the cylinder the cradles tilt automatically according to the inclination of the cylinder until the cylinder is brought into a horizontal position with its opposite end resting on a truck having a different form of cradle 44 to support the upper end of the cylinder. To provide for the swinging of the arms 14 I provide the cables 53 which extend down into convenient position to be reached by an operator standing on the floor below.

I also provide mechanism for locking the arms in position and said locks in the form illustrated consist of the latch 46 pivotally connected at 47 to the arm. A pin 48 is connected with said arm, said pin passing up through an opening 49 in said arm and a spring 50 surrounding said pin, said spring being interposed between said arm and the nut 51 on said pin. The outer end of the latch 46 is adapted to engage notches or seats 52 formed in the cross head 7, and when said latch engages one of said seats the arm is locked in position. In order to release the arm I provide the chain 53 connected to the eyelet 54 on the pin 48, and by drawing down on said chain the latch is released from its recess and the arm can then be moved into the desired position. As the arm is moved around it will register with one of the seats 52 and due to the action of the spring 50 the latch will spring into locking position and lock the arm automatically.

In the drawing of cylinders the cross head is lowered in order to bring the arms 14 to their lowermost position indicated in dotted lines Fig. 1 which lowers the bait down into the glass in the tank 3, the rings 5 having been previously lowered. In order to lift the arms and the bait carried thereby, the valve 28 is opened and the air pressure admitted to the upper end of the tank 26. The water in said tank is forced down through the pipe 25 into the lower end of the cylinder 22 forcing up the piston 24. As water is incompressible, the escape of water from the space above the piston 24 is provided for through the pipe 32 and the valve 40. As the cylinder increases in length and accordingly in weight, greater lifting power is required and this is obtained by relieving proportionately the resistance to the upward movement of the piston 24 by allowing the water to escape in greater quantities from the space above the piston in the cylinder 22. This is provided for by the controller 33, for as the water is forced out through the pipe 32 and up into the controller, the piston 34 of the controller is raised and as said piston is raised through the lever connections described, the valve 40 is opened to greater extent so that the pressure applied to the lower end of the piston 24 of the cylinder 22 moves the arms up at a uniform speed and the cylinder is drawn without any sudden or abrupt increase in speed of drawing, and consequently a greater uniformity of diameter and thickness of glass is possible.

As hereinbefore referred to, the air admitted through the pipe 17 to the cylinder during the drawing operation is previously heated or expanded, so that the pulsations in the drawing operations are avoided, all as fully set forth in the application of even date herewith and above referred to. When the cylinders have been drawn to their full length, the rings 5 are lifted whereupon the heat of the furnace melts off the glass at the lower end of the cylinder and disconnects it from the glass at the lower end of the cylinder and disconnects it from the glass in the tank, whereupon the cylinders are raised to a further extent where the lower end of the cylinders clears the top end of the tank, whereupon by means of the cables 45 the latches 46 having been released, the arms 14 are swung around into the position indicated in dotted lines Fig. 1 or laterally for their entire length, so as to bring them out beyond the tank in position to be lowered. In lowering one of the trucks 42 carrying the movable cradle 43 is brought up into line with the cylinder whereupon the cylinder is lowered, the valve 28 having been moved to bring the air chamber 27 into exhaust position to allow for the lowering of the piston 34 of the controller, as well as the piston 24 of the cylinder 22. The cylinder is lowered gradually and as it is lowered it comes into engagement with the cradle 43 whereupon the truck is moved outwardly, the cylinder being brought to a gradually inclined position until the cylinder is finally lowered to a horizontal position with its upper end resting on one of the trucks carrying the cradle 44, as clearly indicated in Fig. 4 of the drawing. When in this position, the cylinder is separated from the blow pipe and is then in position to be cut up into suitable lengths.

In Fig. 9 I have illustrated a modified form of my invention in which the air is heated electrically instead of by a gas burner before being admitted to the cylinder, and to this end I provide the heating chamber 56 with the heating coils 57 therein. The air is supplied to the heater by the pipe 58. The air passes from the heater by the pipe 59 and this pipe is controlled by the valve 60.

The air passes into the lifting cylinder 61 which has the piston 62 and the hollow piston rod 63. In this case the air not only lifts the cylinder in the drawing operation, but a portion of the air passing through the hollow piston rod enters the cylinder through a flexible pipe connection.

What I claim is:

1. In apparatus for drawing glass cylinders, the combination with a suitable bait, a horizontally swinging arm on which said bait is supported, and means for elevating said arm.

2. In apparatus for forming glass cylinders, the combination of a suitable bait, a swinging arm on which said bait is supported, means for raising said arm and means for locking said arm.

3. In apparatus for forming glass cylinders, the combination of a suitable bait, an arm from which said bait is supported, a vertically movable member, and said arm pivotally mounted to swing horizontally on said member.

4. In apparatus for forming glass cylinders, the combination of a suitable bait, a vertically moving member, a horizontally movable arm carried by said member and supporting said bait, and means for locking said arm to said member.

5. In apparatus for forming glass cylinders, the combination of a suitable bait, a vertically movable member, a horizontally movable arm mounted on said member, and supporting said bait, and a latch carried by said horizontally movable arm adapted to engage said member.

6. In apparatus for forming glass cylinders, the combination of a suitable bait, a vertically movable member, a horizontally movable arm mounted on said member and supporting said bait, and a spring latch carried by said horizontally movable arm adapted to engage said member.

7. In apparatus for forming glass cylinders, the combination of a suitable bait, a vertically movable member, a horizontally movable arm on said member and supporting said bait, a spring actuated latch on said arm, and said member having seats engaged by said latch.

8. In apparatus for forming glass cylinders, the combination of a suitable bait, a vertically movable member, a horizontally movable arm mounted on said member, and supporting said bait, a downwardly movable latch on said arm adapted to engage said vertically movable member, and an operating line connected to said latch.

9. In apparatus for forming glass cylinders, the combination of a suitable bait, a vertically movable yoke member, a horizontally movable arm mounted on said yoke member and supporting said bait.

10. In apparatus for forming glass cylinders, the combination with a suitable frame, of a vertically movable cross head, horizontally movable arms carried by said cross head and baits supported by said arm.

11. In apparatus for forming glass cylinders, the combination of a suitable frame, of a vertically movable cross head, horizontally movable arms mounted at each end of said cross head and baits supported from said arms.

12. In apparatus for forming glass cylinders, the combination of a suitable bait, a support for said bait, a hydraulic cylinder, a piston in said cylinder, means for supplying liquid to both sides of said piston, connections between said piston and said support, means for increasing the pressure on the liquid in the lower end of said cylinder, and means for gradually increasing the rate of flow of the liquid from the upper end of said cylinder.

13. In apparatus for forming glass cylinders, the combination of a suitable bait, a support for same, a hydraulic cylinder, a piston in said cylinder, and means for supplying fluid to both ends of said cylinder, means for increasing the pressure of the liquid on the lower end of said cylinder, an outlet for the liquid in the upper end of said cylinder, a valve controlling said outlet, and a controller operated by the escape of the liquid from the upper end of said cylinder, and connections between said controller and said valve whereby said valve is gradually opened as the length of the cylinder increases.

14. In apparatus for forming glass cylinders, the combination of a suitable bait, a support for said bait, a hydraulic cylinder, a piston in said cylinder, connections between said piston and said support, means for admitting liquid to the piston ends of said cylinder, means for increasing the pressure on the liquid at the end of said cylinder, a valve controlling the outlet of the liquid from the upper end of said cylinder, a cylinder into which the liquid from the upper end of said cylinder discharges, a piston in said cylinder, connections between said piston and said valve.

In testimony whereof I, the said GEORGE C. DEBAY, have hereunto set my hand.

GEORGE C. DEBAY.

Witnesses:
JOHN F. WILL,
S. F. ARMSTRONG.